United States Patent [19]

Koski

[11] Patent Number: 5,010,122

[45] Date of Patent: Apr. 23, 1991

[54] PLASTIC-RUBBER COMPOSITES

[75] Inventor: Greg Koski, Leominster, Mass.

[73] Assignee: R.W. Technology, Inc., Cheshire, Conn.

[21] Appl. No.: 115,901

[22] Filed: Nov. 2, 1987

[51] Int. Cl.$^5$ .......................... C08K 3/02; C08K 5/23; C08L 7/00; C08L 9/00

[52] U.S. Cl. .................................. 524/80; 524/190; 524/525; 525/101; 525/105; 525/106

[58] Field of Search ....................... 525/101, 105, 106; 524/375, 190, 80, 525

[56] References Cited

PUBLICATIONS

Monte, "Titanates", Modern Plastics Encyclopedia, vol. 61, No. 10A, Oct. 1984, pp. 2 & 124.
Carbowax, Polyethylene Glycols, Union Carbide Industrial Chemicals Division.
Material Safety Data Sheet, Carbowax, Polyethylene Glycol 3350, Union Carbide.
Carbowax, Polyethylene Glycols, Physical Properties, Union Carbide Industrial Chemical Division.

*Primary Examiner*—Allan M. Lieberman
*Attorney, Agent, or Firm*—Bachman & LaPointe

[57] ABSTRACT

The present invention relates to thermoplastic compositions formed from discarded rubber products. Thermoplastic compositions in accordance with the present invention comprises rubber particulate having a size less than about 10 mesh, a thermoplastic material, and at least one coupling agent with the rubber particulate and the thermoplastic material being present in a weight ratio in the range of from about 1:9 to about 9:1 and the at least one coupling agent being present in an amount less than about 3% by weight of the material to be coupled to. A process for forming the thermoplastic compositions is also described.

26 Claims, No Drawings

PLASTIC-RUBBER COMPOSITES

BACKGROUND OF THE INVENTION

The present invention relates to thermoplastic polymer compositions comprising particulate vulcanized rubber, a thermoplastic material and at least one coupling agent.

The environmental problems created by discarded tires are significant and growing in such proportions that landfills are often refusing to accept tires and governmental agencies are searching for solutions. Due to the lack of successful commercial projects that utilize discarded tires, there are an estimated two billion discarded tires in the United States alone. In addition to this, estimates are that 240 to 300 million tires will be discarded annually. Many of the current uses for discarded tires either raise serious environmental issues or have such limited commercial feasibility that they make no significant impact on the problem.

Attempts have been made to reclaim vulcanized rubber for decades but mainly for the purpose of de-vulcanizing in order to have once again a processable rubber. This technology generally involves taking particulate vulcanized rubber and defiberizing it, and treating it with combinations of chemicals, steam heat and/or considerable mechanical working to reduce molecular weight and thereby enable the resultant material to be processed and re-vulcanized as a conventional rubber product. The reclaimed rubber so produced is then blended with virgin rubber or used directly depending on the particular technique used and the end product to be made. Examples of these techniques can be seen in U.S. Pat. Nos. 2,783,213 and 2,966,468.

The use of particulate vulcanized rubber as an ingredient in thermoplastic compounds is very limited. U.S. Pat. No. 3,489,710 describes how to manufacture a composition of devulcanized rubber with selected polymers to create a reconstituted rubber product. A disadvantage of this process is that it requires a devulcanization step for the rubber and therefore appears to be limited to rubber products. U.S. Pat. No. 4,341,667 relates to a composition of microwave devulcanized rubber and select polymers. The primary disadvantage of this process is the cost associated with devulcanization and limited usefulness.

Various additive compounds have been used in compositions of vulcanized rubber polymers. These compounds have included surfactants such as those set forth in U.S. Pat. No. 4,386,182 and liquid low molecular weight polymers such as those set forth in U.S. Pat. No. 4,481,335.

There is still a need for processable compositions of vulcanized rubber and thermoplastic materials which exhibit excellent overall toughness and strength. There is also a need for plastic-rubber compositions which can be processed in a relatively simple and economic technique without having to devulcanize the particulate rubber.

Accordingly, it is an object of the present invention to provide plastic-rubber compositions having utility in producing high quality non-rubber thermoplastic products as well as cross-linked products and rubber products.

It is a further object of the present invention to provide plastic-rubber compositions as above having excellent physical properties.

It is yet a further object of the present invention to provide a relatively simple and economic process for producing the above plastic-rubber compositions.

These and other objects and advantages will become more apparent from the following description.

SUMMARY OF THE INVENTION

It has now been found that compositions of comminuted vulcanized rubber and thermoplastic polymers, particularly those of the olefinic branch, treated with silane or other chemical coupling agents in accordance with the present invention produce a processable compound unique in its properties to manufacturing cost ratio. Products manufactured from such compounds have been found to exhibit excellent processability, overall toughness and strength. It is believed that the ingredients act in a synergistic fashion to give a compound with superior impact strength, as compared to the base thermoplastic material, which is retained at cold temperatures.

Thermoplastic compositions in accordance with the present invention comprise rubber particulate having a size less than about 10 mesh, a thermoplastic material and at least one coupling agent with said rubber particulate and said thermoplastic material being present in a weight ratio in the range of from about 1:9 to about 9:1, preferably from about 1:3 to about 3:1, and said at least one coupling agent being present in an amount less than about 3% by weight of the material to be coupled to. The rubber particulate may be formed from natural rubber, synthetic polymers and co-polymers of rubber or blends thereof. The thermoplastic material preferably comprises an olefin, a co-polymer of an olefin, a homopolymer of an olefin or blends thereof. The coupling agent preferably comprises a silane coupling agent having the formula $R_{(n)}SiX_{(4-n)}$ wherein X represents a hydrolyzable group which reacts via hydrolysis in a manner such that a bond between the X group and a silicone atom is replaced by a bond between the silicone atom and an inorganic material, R represents a nonhydrolyzable organic radical group which bonds to organic substrates. If desired, two coupling agents and/or an inorganic filler may be used to bond the rubber and thermoplastic material. In addition, any blowing agent, physical or chemical in nature, such as nitrogen, azodicarbonamide, etc. may be added to assist in the production of foamed products.

To produce the foregoing thermoplastic composition, vulcanized rubber is first ground to particulate having a size less than about 10 mesh. The rubber particulate is then mixed with the thermoplastic material in a mixer at a shear rate less than that which causes devulcanization of the rubber and at a relatively low pressure to reduce the creation of a thermal history. Preferably, mixing is carried out at a temperature near the mid-point of the base polymer published melt range. During mixing, at least one coupling agent, preferably two, are blended into the mixture. The resultant composition is then processed in any desired manner. For example, the thermoplastic composition may be pelletized by feeding it through a die face. The pelletized material can then be packaged for shipment to processors. Alternatively, the mixer can feed the thermoplastic composition directly into final processing equipment such as sheet extruders, profile extruders, injection molders and the like.

DETAILED DESCRIPTION

As previously discussed, the present invention relates to the recycling of discarded rubber products and the formation of thermoplastic compositions which have excellent physical properties and readily lend themselves to a variety of applications. The discarded rubber products may include pneumatic tires, liners, tubes and/or any other discarded rubber product or by-product formed from natural rubber, polymers and co-polymers of synthetic rubber, i.e. styrene-butadiene rubber, ethylene-propylene diene rubber, and the like, or blends thereof. While it is preferred that the rubber be vulcanized, the composition of the present invention can also be formed using virgin or devulcanized rubber. The term vulcanized rubber as used herein is meant to include whatever fillers, additives, and the like which are found to be bound in the rubber such as carbon black, fiber, oils, and zinc oxide in the case of whole tire crumb.

The rubber products to be used are first ground to particulate having a size less than or finer than about 10 mesh. While rubber particulate having sizes in the range of from about 10 mesh to about 30 mesh have been found to be quite useful in forming the desired thermoplastic compositions, finer particulate sizes can be used. Generally, the finer the particulate, the better the cosmetic appearance.

The rubber particulate may be formed using any suitable grinding technique known in the art. Alternatively, commercially available ground waste rubber could be used. Any metal within the waste rubber should be removed, either mechanically or magnetically. Fibrous material in the waste rubber such as tire cord fiber up to about 30% by weight may be retained since it does not adversely affect the formation of the thermoplastic compositions of the present invention.

After the rubber particulate or crumb has been formed, it along with the thermoplastic material and one or more coupling agents are fed into a continuous mixing device. The thermoplastic material may comprise any suitable thermoplastic material such as olefinic polymers or thermoplastic elastomeric materials. Suitable olefinic polymers include but are not limited to polyethylenes of various densities, linear low density polyethylene, polypropylene, ionomers, polybutylene, ethylene vinyl acetate, and copolymer or homopolymer versions of these polymers. Also suitable for use are blends of the aforementioned polymers and filled polymer systems that use one or more of these polymers as the base ingredient.

During mixing, the weight ratio of vulcanized rubber to thermoplastic material preferably ranges from about 1:9 to about 9:1, most preferably from about 1:3 to about 3:1. It has been found that as the rubber component percentage increases so does the flexibility and impact strength of the final product. Hence, one of the advantages of the present invention is the ability to tailor stiffness and strength by varying the rubber content in the mixture.

Certain reactive polymers may be used as a single coupling agent adhereing directly to the rubber. In many cases, however, two coupling agents will be added to the mixture to form the molecular bridge between the individual substrates of vulcanized rubber and thermoplastic material, particularly in the case of thermoplastic olefins. When two coupling agents are used, one coupling agent is selected because its organic functionality tends to bond to the vulcanized rubber while the other coupling agent is preferably chosen for its organic reactivity to the particular thermoplastic material being used and thereby bonds to the thermoplastic substrate. In general, the inorganic functions of the coupling agents are highly attractive to each other, thus, they bond and complete the bridge of organic (the rubber particulate) to inorganic to inorganic to organic (the thermoplastic material). If desired, an inorganic filler such as silica, talc, calcium carbonate, etc. may be used as the middle point in the bridge with the inorganic functionalities of the two coupling agents bonding to it. When used, the inorganic filler is present in an amount from about 1% to about 30%, preferably from about 3% to about 8% by weight.

Silane coupling agents having the general formula $R_{(n)}SiX_{(4-n)}$ have been found to be particularly useful. The X group represents a hydrolyzable group which will react via hydrolysis in a manner such that the bond between the X group and the silicone atom will be replaced by a bond between the silicone atom and the inorganic substrate itself. The R group is a nonhydrolyzable organic radical with a functionality that enables it to bond to organic substrates. The bond created via silane coupling is related to several factors: wetting, hydrogen bonding, surface energy, interpenetrating network formation and covalent bonding.

Selection of the most suitable silanes and usage level is difficult to calculate and is best accomplished by empirical methods. Normally, the usage level is in the range of from an amount effective to obtain coupling to about 3.0% by weight of the material to be coupled to. Preferably, the usage level is in the range of from about 0.01% to about 2.0%. If the silane coupling agent is diluted, then a higher percentage has to be used.

It is possible to use coupling agents other than those based on silane chemistry at similar usage levels. Other types of coupling agents which can be used include but are not limited to titanates, zirconates, and chemically modified polymers that have an acidic monomeric function grafted onto the base polymer such as acrylic acid or other functions resulting in random carboxyl groups distributed along the polymer chain. These products can be used as that segment of a coupling bridge that bonds the thermoplastic material to the inorganic function or in the case of rubber that contains significant filler levels such as that used in tire manufacturing, the reactive polymer alone can improve properties of the rubber/thermoplastic composition by bonding directly.

Mixing of the rubber particulate, thermoplastic material and the coupling agent(s) may be done using any suitable mixing device known in the art. For example, mixing may be carried out in a ribbon mixer. Alternatively, it may be carried out with a continuous mixer having two counter-rotating rotors or screws to blend the material. Devices such as Farrel Continuous Mixers or twin screw extruders may be used. A Farrel Continuous Mixer or a similar counter-rotating, dual rotor, high shear continuous mixer is preferred for its ability to mix at lower energy levels for equal amounts of mixing, thereby creating less thermal history for similar degrees of mixing. Further, it has been found that the use of a continuous mixer enables greater economies of scale, simplified quality assurance and lower cost than methods requiring batch production, such as a Banbury Mixer.

It is desirable that the temperature during mixing be maintained near the mid-point of the base polymers published melt range. For example, temperature during mixing is typically in the range of from about 330° F. to about 400° F. when the thermoplastic material is an olefinic polymer. As previously mentioned, it is preferred that the mixer used to blend the ingredients be a high shear continuous mixer. Impact strength tends to be superior when the ingredients being mixed are subjected to high shear. To illustrate this, 25% high density and 35% high density polyethylene were mixed in low shear and high shear mixers. The impact strength was then determined using ASTM method D-256. The results are described below in Table I.

TABLE I

| Material | Mixer | Impact Strength (ft-lbs/in) |
|---|---|---|
| 25% High Density Polyethylene | Low | 1.9 |
| 25% High Density Polyethylene | High | 4.6 |
| 35% High Density Polyethylene | Low | 2.0 |
| 35% High Density Polyethylene | High | 3.7 |

Some coupling agents may require sequential addition of the materials to the mixer to best facilitate the reaction. This can be done by utilizing a series of inlet ports along the mixer. The various ingredients may be added through these ports in any desired sequence.

Other additives such as coloring agents, stabilizers and/or blowing agents may be blended into the mixture while it is within the mixer. When added, these additives are added in the ranges recommended by the manufacturer. Blowing agents such as nitrogen, azodicarbonamide, etc. typically in an amount ranging from about 0.01% to about 4.0% by weight are useful in the formation of foamed products such as rigid foams.

After mixing, the thermoplastic composition may be pelletized by feeding it through a die face. The pelletized material may then be packaged for shipment to processors. Alternatively, the thermoplastic composition can be fed directly into final process equipment such as sheet extruders, profile extruders, injection molders and the like.

The types of products that can be manufactured from the thermoplastic composition of the present invention include footwear, material handling products, floor mats, skid mats, agricultural products, dunnage devices, wheels, sound deadening products, and tubing.

By way of illustration, the following examples are set forth as being merely exemplary and not limitative of the manner in which vulcanized rubber particulate may be blended with a thermoplastic material and one or more coupling agents to form the new composition products of this invention.

EXAMPLE I

A composition was blended into a Farrel Continuous Mixer-45 consisting of the following ratio of rubber to plastic:

(a) 50% whole tire ground rubber crumb having a size 10 to 30 mesh treated with 3-Mercaptopropyltrimethoxysilane (M8500 Petrarch); and (b) 50% ethylene-vinyl acetate (USI Ultrathene 636-04) treated with N-(2-Aminoethyl-3-Aminopropyl)Trimethoxysilane)(A0700 Petrardh).

The mixer had a 4" rotor bore and a 5" pumping extruder. The orifice openings in the mixer ranged from 0.5" to 1.5". Typical outputs were approximately 1000 pounds per hour and mixture residence time in the mixer was approximately 30 seconds. Rotor speed was approximately 300 to 350 RPM.

After mixing was completed, the output was pelletized. The pellets were then injected molded into ASTM test specimens. The specimens were subjected to ASTM tensile test D-638 and ASTM flexural test D-790. The tensile strength of the specimens was about 600 psi and the elongation was about 149%.

For comparison purposes, a composition consisting of: (a) 50% whole tire ground rubber crumb have a size 10 to 30 mesh with no treatment; and (b) 50% ethylene-vinyl acetate (USI Ultrathene 636-04) with no treatment was mixed in the same mixer and pelletized. The pellets were injected into ASTM test specimens and subjected to the same tensile and elongation tests. The tensile strength of the specimens was about 531 psi and the elongation was about 130%.

EXAMPLE II

A composition consisting of the following ratio of rubber to plastic:

(a) 50% whole tire ground rubber crumb having a size 10 to 30 mesh treated with 3-Mercaptopropyltrimethoxysilane (M8500 Petrarch); and (b) 50% linear low density polyethylene (Dow Dowlex 2047) treated with N-(2-Aminoethyl-3-Aminopropyl)Trimethoxysilane) (A0700 Petrarch) was blended in the aforementioned Farrel Continuous Mixer-45 and the output was pelletized. As before, the pellets were injected molded into ASTM test specimens. The specimens were then subjected to the same standard ASTM tensile and elongation tests. The tensile strength was 909 psi, the flexural modulus was 14,403 and the flexural strength was 480.

For comparison purposes, a composition consisting of: (a) 50% whole tire ground rubber crumb having a size 10 to 30 mesh with no treatment; and (b) 50% linear low density polyethylene (Dow Dowlex 2047) with no treatment was blended, pelletized and injection molded into test specimens which were subjected to the same tensile and elongation tests. The tensile strength was 864 psi, the flexural modulus was 9,492 and the flexural strength was 328.

EXAMPLE III

A composition consisting of:

(a) 50% whole tire ground rubber crumb having a size 10 to 30 mesh treated with 3-Mercaptopropyltrimethoxysilane (8500 petrarch); and (b) 50% polypropylene (USI 8755HK) treated with N-(2-Aminoethyl-3-Aminopropyl)Trimethoxysilane) (A0700 Petrarch) was blended in the aforementioned Farrel Continuous Mixer-45. The output was pelletized and injection molded into test specimens. As before, ASTM tensile and flexural tests were performed. The tensile strength was 784 psi, the flexural modulus was 57,258 and the flexural strength was 1129.

For comparison purposes, a composition consisting of: (a) 50% whole tire ground rubber crumb having a size 10 to 30 mesh with no treatment; and (b) 50% polypropylene (USI 8755HK) with no treatment was blended in the Farrel mixer. The output was pelletized, injected molded into test specimens and subjected to the same tensile and flexural tests. The tensile strength was 893 psi, the flexural modulus was 39,285 and the flexural strength was 816.

EXAMPLE IV

A composition consisting of:

(a) 65% whole tire ground rubber crumb having a size 10 to 30 mesh treated with Mercapto silane on amorphous hydrated silica (Ciptane-1); and (b) 31% high density polyethylene (Dow 10062N) treated with 4% acrylic acid chemically coupled polypropylene (BP Polybond 1001) was blended, formed into test samples and subjected to the same tensile and flexural tests as before. The tensile strength was 747 psi, the flexural modulus was 25,937 and the flexural strength was 657.

For comparison purposes, a composition consisting of: (a) 65% whole tire ground rubber crumb having a size 10 to 30 mesh with no treatment; and (b) 35% high density polyethylene (Dow 10062N) with no treatment was blended, formed into test samples and subjected to the same tensile and flexural tests. The tensile strength was 890 psi, the flexural modulus was 19,164 and the flexural strength was 461.

As can be seen from the foregoing examples, compositions formed in accordance with the present invention exhibit excellent combinations of mechanical properties, particularly flexural properties.

While coupling agents typically come in the form of a liquid, it is preferred to add the coupling agents to the ingredients in the mixer in solid form.

While it is preferred to use one or more coupling agents to bond the rubber to the plastic, it is possible to bond the plastic to the rubber without such agents by generating sufficient heat during mixing to make the materials being mixed more reactive and thereby encouraging some natural bonding.

It is apparent that there has been provided in accordance with this invention rubber-plastic compositions which fully satisfy the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A thermoplastic composition comprising a vulcanized rubber particulate having a particle size finer than about 10 mesh, a thermoplastic material and at least one coupling agent for adhering to and forming a covalent bond with at least one of said rubber particulate and said thermoplastic material, said rubber particulate and said thermoplastic material being present in a weight ratio in the range of from about 1:9 to about 9:1 and said at least one coupling agent being present in an amount effective to obtain coupling to said at least one of said rubber particulate and said thermoplastic material to about 3% by weight of said at least one of said rubber particulate and said thermoplastic material to be coupled to, and said rubber particulate comprising particulate formed from at least one of ground pneumatic tires, ground liners and ground tubes.

2. A thermoplastic composition comprising a vulcanized rubber particulate having a particle size finer than about 10 mesh, a thermoplastic material and at least one coupling agent for adhering to and forming a covalent bond with at least one of said rubber particulate and said thermoplastic material, said rubber particulate and said thermoplastic material being present in a weight ratio in the range of from about 1:9 to about 9:1 and said at least one coupling agent being present in an amount effective to obtain coupling to said at least one of said rubber particulate and said thermoplastic material to about 3% by weight of said at least one of said rubber particulate and said thermoplastic material to be coupled to, and said rubber particulate having a fiber content up to about 30% by weight.

3. A composition as in claim 2 wherein said rubber particulate is formed from at least one material selected from the group consisting of natural rubber, synthetic polymers of rubber, synthetic co-polymers of rubber, and blends thereof.

4. A thermoplastic composition as in claim 2 wherein said thermoplastic material is a material selected from the group consisting of polyethylene, linear low density polyethylene, polypropylene, ionomers, polybutylene, and ethylene vinyl acetate.

5. A thermoplastic composition as in claim 2 wherein said ratio of rubber particulate to thermoplastic material is in the range of from about 1:3 to about 3:1.

6. A thermoplastic composition as in claim 2 wherein said at least one coupling agent is present in an amount from about 0.01% to about 2.0% by weight.

7. A thermoplastic composition comprising a vulcanized rubber particulate having a particle size finer than about 10 mesh, a thermoplastic material and at least one coupling agent, said thermoplastic material being present in a weight ratio in the range of from about 1:9 to about 9:1, said at least one coupling agent being present in an amount effective to obtain coupling to at least one of said rubber particulate and said thermoplastic material to about 3% by weight of said at least one of said rubber particulate and said thermoplastic material to be coupled to, and said at least one coupling agent comprising a silane coupling agent having the formula $R_{(n)}SiX_{(4-n)}$ wherein X represents a hydrolyzable group which reacts via hydrolysis in a manner such that a bond between the X group and a silicone atom is replaced by a bond between the silicone atom and an inorganic material, R represents a nonhydrolyzable organic radical group which bonds to organic substrates.

8. A thermoplastic composition comprising a vulcanized rubber particulate having a particle size finer than about 10 mesh, a thermoplastic material and two coupling agents, said agents producing a coupling bridge between said rubber particulate and thermoplastic material, said thermoplastic material being present in a weigh ratio in the range of from about 1:9 to about 9:1, and each said coupling agent being present in an amount effective to obtain coupling to about 3% by weight of said at least one of said rubber particulate and said thermoplastic material to be coupled to.

9. A thermoplastic composition as in claim 8 wherein one of said coupling agents comprises an agent selected for its bondability to vulcanized rubber and the other of said coupling agents is selected for its bondability to said thermoplastic material.

10. A thermoplastic composition as in claim 8 further comprising from about 1% to about 30% of an inorganic filler.

11. A thermoplastic composition as in claim 10 further comprising from about 3% to about 8% of an inorganic filler.

12. A thermoplastic composition as in claim 4 further comprising from about 0.01 to about 4.0% of a blowing agent.

13. A process for manufacturing a thermoplastic composition comprising:
   grinding at least one vulcanized rubber material selected from the group consisting of natural rubber, synthetic polymers of rubber, synthetic copolymers of rubber, and blends thereof to particulate having a size less than about 10 mesh;
   mixing said rubber particulate with a thermoplastic material so that said rubber particulate and said thermoplastic material are present in a weight ratio in the range of from about 1:9 to about 9:1; and
   said mixing step including blending said rubber particulate and thermoplastic material with an effective amount of at least one agent for forming a covalent bond with at least one of said rubber particulate and said thermoplastic material for coupling the rubber particulate and the thermoplastic material.

14. A process as in claim 13 wherein said mixing step comprises mixing said rubber particulate with a material selected from the group consisting of an olefin, a copolymer of an olefin, a homopolymer of an olefin, and blends thereof.

15. A process as in claim 13 wherein said blending step comprises blending said rubber particulate and said thermoplastic material with from about 0.01% to about 2.0% by weight relative to the material to be coupled to of at least one silane coupling agent having the formula $R_{(n)}SiX_{(4-n)}$ wherein X represents a hydrolyzable group which reacts via hydrolysis in a manner such that a bond between the X group and a silicone atom is replaced by a bond between the silicone atom and an inorganic material, R represents a nonhydrolyzable organic radical group which bonds to organic substrates.

16. A process as in claim 13 further comprising adding from about 0.01% to about 4% of a blowing agent to said mixture.

17. A process as in claim 13 wherein said mixing step is performed under continuous high shear conditions using a counter rotating, dual rotor, continuous mixer.

18. A thermoplastic composition comprising a blend of vulcanized rubber particulate having a particle size finer that about 10 mesh, thermoplastic material and at least one coupling agent for adhering to and forming a covalent bond with at least one of said rubber particulate and said thermoplastic material, said rubber particulate and said thermoplastic material being present in a weight ratio in the range of from about 1:9 to about 9:1 and said at least one coupling agent being present in an amount effective to obtain coupling to said at least one of said rubber particulate and said thermoplastic material to about 3% by weight of said at least one of said rubber particulate and said thermoplastic material to be coupled to.

19. A composition as in claim 18 wherein said rubber particulate is formed from at least one material selected from the group consisting of natural rubber, synthetic polymers of rubber, synthetic co-polymers of rubber, and blends thereof.

20. A thermoplastic composition as in claim 18 wherein said thermoplastic material comprises a material selected from the group consisting of an olefin, a copolymer of an olefin, homopolymer of an olefin, and blends thereof.

21. A thermoplastic composition as in claim 20 wherein said thermoplastic material is a material selected from the group consisting of polyethylene, linear low density polyethylene, polypropylene, ionomers, polybutylene, and ethylene vinyl acetate.

22. A thermoplastic composition as in claim 18 wherein said ratio of rubber particulate to thermoplastic material is in the range of from about 1:3 to about 3:1.

23. A thermoplastic composition as in claim 18 wherein said at least one coupling agent is present in an amount from about 0.01% to about 2.0% by weight.

24. A thermoplastic composition as in claim 18 further comprising from about 0.01% to about 4.0% of a blowing agent.

25. A thermoplastic composition as in claim 8 wherein each said coupling agent possesses both organic functionality and inorganic functionality.

26. A thermoplastic composition as in claim 18 wherein said at least one coupling agent possesses both organic functionality and inorganic functionality.

* * * * *